United States Patent [19]

Hoppe et al.

[11] Patent Number: 5,366,658

[45] Date of Patent: Nov. 22, 1994

[54] USE OF POLYMETHYLALKANES AS BIODEGRADABLE BASE OILS IN LUBRICANTS AND FUNCTIONAL FLUIDS

[75] Inventors: Dirk Hoppe, Hilden; Horst Pennewiss, Darmstadt; Frank Kraushaar, Essen; Michael Stehr, Gelsenkirchen; Roland Streck; Jaroslaw Monkiewicz, both of Marl; Hans G. Wey, Mülheim/Ruhr, all of Germany

[73] Assignee: Huls Aktiengesellschaft, Marl, Germany

[21] Appl. No.: 179,246

[22] Filed: Jan. 10, 1994

[30] Foreign Application Priority Data

Jan. 9, 1993 [DE] Germany .............................. 4300418
Oct. 25, 1993 [DE] Germany .............................. 4336317

[51] Int. Cl.⁵ ................ C10M 107/04; C10M 107/06; C10M 105/32
[52] U.S. Cl. .......................... 252/56 S; 585/10; 585/13; 585/254; 585/511
[58] Field of Search ............ 585/10, 13, 254, 511; 252/56 S

[56] References Cited

U.S. PATENT DOCUMENTS 5,306,856  4/1994  Streck et al. .................... 585/508

Primary Examiner—Prince Willis, Jr.
Assistant Examiner—Cephia D. Toomer
Attorney, Agent, or Firm—Oblon, Spivak, McClelland, Maier & Neustadt

[57] ABSTRACT

The invention relates to the use of polymethylalkanes having terminal methyl groups and methylene and ethylidene groups of the formula I

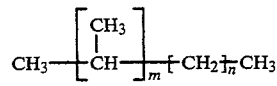

in which the total number of C atoms $n+2\,m+2$ is 20 to 100 and the ratio of the methyl and methylene groups to the ethylidene groups is 3 to 20:1 and the ethylidene groups are always separated by at least one methylene group, as biodegradable base oils for lubricants and functional fluids. Suitable polymethylalkanes are obtained by oligomerization of $\alpha,\omega$-diolefins, for example in particular according to P 41 19 332.6, or by pyrolysis of ethene/propane copolymers and subsequent hydrogenation in each case. The polymethylalkanes can be combined with conventional additives and other degradable or non-degradable base oils.

9 Claims, No Drawings

USE OF POLYMETHYLALKANES AS BIODEGRADABLE BASE OILS IN LUBRICANTS AND FUNCTIONAL FLUIDS

BACKGROUND OF THE INVENTION

Field of the Invention

The present invention relates to biodegradable base oils for lubricants and functional fluids comprising polymethylalkanes having terminal methyl groups and methylene and ethylidene groups. These polymethylalkanes are useful as base oils in formulations with conventional additives and mixtures of other biodegradable or non-degradable base oils.

Discussion of the Background

Owing to the increased environmental awareness and the more stringent environmental legislation, lubricating oils and functional fluids, such as hydraulic oils, based on non-biodegradable base oils are being examined more and more critically since they can enter the environment, especially the soil, as a result of leaks after accidents or even during the replacement of these fluids. Soil contaminated in this manner must be cleaned at considerable expense. It is therefore increasingly desirable to find biodegradable lubricating oils and functional fluids.

Three product classes have been identified which are useful as base oils for biodegradable lubricants and functional fluids: synthetic esters, natural esters and polyalkylene glycols (PAG), mainly polyethylene glycols (PEG). These classes of compounds exhibit good biodegradability as well as very good lubricating properties, such as, for example, improved viscosity/temperature behaviour, high lubricating capacity and heat resistance.

In addition to these positive properties, however, these base oil types have some disadvantages which greatly limit their use in certain areas. The biodegradable PAGs are, as a rule, water-soluble. Thus, it is difficult to detect leaks, and contamination is rapidly distributed. Furthermore, PAGs frequently have high fish toxicity. Further, PAGs are largely incompatible with the conventional coatings and sealing materials.

Moreover, the conversion of plants which produced fluids based on non-biodegradable base oils into plants producing fluids based on the biodegradable base oils can be expensive. These plants have to be completely emptied and cleaned, since PAGs are immiscible with products based on mineral oil.

Synthetic as well as natural esters have only low hydrolytic stability. Their compatibility with sealing materials is also problematic, as in the case of the PAG. Furthermore, special additive packages are required for the formulation of ready-to-use products.

Natural esters, such as, for example, rapeseed oil, also have the disadvantage of low oxidation stability, exhibit poor low-temperature behaviour in some cases and have fluctuating product quality.

Hydrocarbons based on mineral oils and synthetic hydrocarbons, for example poly-α-olefins (PAO), do not have the above-mentioned disadvantages but are only slowly biodegradable since they are mixtures of straight-chain, cyclic and/or highly branched compounds. Where there is a high proportion of the readily degradable n-alkanes, such mixtures are in the form of waxes at room temperature and are unsuitable as lubricants.

Only dimeric α-olefins (PAO 2), which are biodegradable to an extent of 45 to 92%, according to CEC L-33-T-82, constitute an exception (see for example, EP-A 0 468 109). However, owing to their low viscosity (KV=2 mm$^2$/s at 100° C.), these products as such can be used as base oils only in a few exceptional cases and are added to lubricating oil formulations mainly in low concentration. On the other hand, trimeric α-olefins (PAO 4, KV=4 mm$^2$/s at 100° C.) exhibit a substantially lower biodegradability of only 24% in the above-mentioned CEC test. These components are therefore unsuitable as base oils for biodegradable functional fluids and lubricants.

SUMMARY OF THE INVENTION

Accordingly, one object of the present invention is to provide compounds from the group comprising the synthetic hydrocarbons which, on the one hand, are suitable as base oils for lubricants and functional fluids and, on the other hand, are biodegradable to an extent of at least 50%, in particular up to 80% or more, according to CEC L-33-T-82.

In achieving this object, the present inventors have surprisingly found that certain polymethylalkanes are substantially biodegradable and therefore can serve as biodegradable base oils for lubricants and functional fluids. This is in contradiction to the commonly held teaching (for example DGMK Research Report 461-01, page 30), that methyl groups inhibit biodegradability. With regard to the lubricants, these compounds are at least equivalent and in some cases even superior to the PAOs used according to the prior art.

DETAILED DESCRIPTION OF THE PREFERRED EMBODIMENTS

Suitable polymethylalkanes in accordance with the present invention comprise polymethylalkanes having terminal methyl groups and internal methylene and ethylidene groups. These polymethylalkanes are of the formula I:

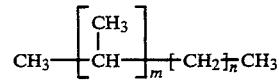

wherein the total number of C atoms (n+2m+2) is 20 to 100, preferably, 20 to 60. The ratio of methyl and methylene groups to ethylidene groups is 3-20:1, and the ethylidene groups are always separated by at least one methylene group. The weight average molecular weight of the polymethylalkanes of the present invention is 280–1400 g/mol, preferably 300–800 g/mol.

These polymethylalkanes can be used as the principle component, the base oil, in formulations. Conventional additives and other biodegradable or non-degradable base oils can suitably be present. When conventional additives are used in base oil formulations, they are suitably present of from 0.5 to 5 weight % based on the total weight of the composition. When the polymethylalkanes are used in motor oil formulations, conventional additives can suitably be present in concentrations up to 10 weight % based on the total weight of the composition. Any suitable conventional additives can be used.

Suitable biodegradable base oils which can be mixed with the polymethylalkanes of the present invention include pentaerythritol esters, oligo esters and dicarboxylic acid esters. Suitable non-biodegradable base oils which can be mixed with the polymethylalkanes of the present invention include poly-α-olefins and conventional mineral oils.

Suitable polymethylalkanes in accordance with the present invention can be prepared using conventional techniques; for example, by co-oligomerization of ethene and propylene, by pyrolysis of ethene/propane copolymers and subsequent hydrogenation or by oligomerization of 1,ω-dienes and subsequent hydrogenation. Particularly suitable polymethylalkenes are prepared by oligomerization of α,ω-olefins according to U.S. Pat. No. 5,306,856 (incorporated herein by reference) in the liquid phase at 150° to 350° C. in the presence of $AlX_3$ or $AlX_2H$ as catalysts and then hydrogenated with conventional hydrogenation catalysts, such as, for example, Pd/C, or Raney nickel, at a pressure of 20 to 150 bar. X denotes a (cyclo)aliphatic or aromatic radical having 1 to 30 C atoms.

The pyrolysis of ethene/propylene copolymers is carried out at temperatures of 300°–450° C. and a pressure of 0.5 to 200 bar, hydrogenation subsequently being effected by means of conventional hydrogenation catalysts.

Having generally described this invention, a further understanding can be obtained by reference to certain specific examples which are provided herein for purposes of illustration only and are not intended to be limiting unless otherwise specified.

EXAMPLES

CEC-L-33-T-82 was used to determine the biodegradibility of the liquid substances not soluble in water. Details regarding this standard test are available from the Coordinating European Council (CEC), 61 New Carendish Street, London, W1M 8AR, England.

EXAMPLE 1

A synthetic, methyl-substituted n-alkane mixture was prepared by oligomerization of 1,7-octadiene according to P 41 19 332.6 with subsequent hydrogenation by means of an Ni catalyst at 160° C. and 95 bar pressure to an iodine number of ≦1 and fractional distillation. The product had an weight average molecular weight (Mn) of 418 (determined by GPC) and on average 9.5 methylene and methyl groups per ethylidene group and exhibited the following properties:

| Viscosity at 10° C.: | 4.0 mm$^2$/s | DIN 51,562 |
|---|---|---|
| Viscosity at 40° C.: | 20.1 mm$^2$/s | DIN 51,562 |
| Viscosity index E: | 91 | DIN ISO 2909 |
| Pour point: | −45° C. | DIN ISO 3016 |
| Flashpoint: | 214° C. | DIN ISO 2592 |
| Noak volatility: | 18% | DIN 51,581 |
| Gear rig test by the FZG method, A 8.3/90: | Load level 4 | DIN 51,354 |

This hydrocarbon mixture has a biodegradability of 92% according to CEC-L-33-T-82.

EXAMPLE 2

A synthetic, methyl-substituted n-alkane mixture was 5 prepared by oligomerization of 1,7-octadiene with subsequent hydrogenation according to Example 1 to an iodine number of ≦1 and fractional distillation. The product had a weight average molecular weight (Mn) of 472 (determined by GPC), on average 8.5 methylene and methyl groups per ethylidene group, and exhibited the following properties:

| Viscosity at 100° C.: | 5.6 mm$^2$/s | DIN 51,562 |
|---|---|---|
| Viscosity at 40° C.: | 26.5 mm$^2$/s | DIN 51,562 |
| Viscosity index E: | 158 | DIN ISO 2909 |
| Pour point: | −42° C. | DIN ISO 3016 |
| Flashpoint: | 244° C. | DIN ISO 2592 |
| Noak volatility: | 7.6% | DIN 51,581 |
| Gear rig test by the FZG method, A 8.3/90: | Load level 5 | DIN 51,354 |

This hydrocarbon mixture has a biodegradability of 82% according to CEC-L-33-T-82.

EXAMPLE 3

A synthetic, methyl-substituted n-alkane mixture was prepared by oligomerization of 1,7-octadiene with subsequent hydrogenation according to Example 1 to an iodine number of <1 and fractional distillation. The product had a weight average molecular weight Mn of 543 (determined by GPC), on average 7.8 methylene and methyl groups per ethylidene group, and exhibited the following properties:

| Viscosity at 100° C.: | 8.5 mm$^2$/s | DIN 51,562 |
|---|---|---|
| Viscosity at 40° C.: | 46.8 mm$^2$/s | DIN 51,562 |
| Viscosity index E: | 162 | DIN ISO 2909 |
| Pour point: | −42° C. | DIN ISO 3016 |
| Flashpoint: | 244° C. | DIN ISO 2592 |
| Noak volatility: | 5% | DIN 51,581 |
| Gear rig test by the FZG method, A 8.3/90: | Load level 6 | DIN 51,354 |

This hydrocarbon mixture has a biodegradability of 89% according to CEC-L-33-T-82.

EXAMPLE 4

Pyrolysis of an Ethylene/Propylene Polymer

In a 5 l stirred autoclave, 1.8 kg of an ethene/proplene cooligomer was heated under nitrogen to 380° C. and left for 4 hours at this temperature. During this time, the pressure increases to 20 bar. After cooling to room temperature and releasing the pressure, 1.6 kg of a brownish yellow oil which had an iodine number of 47 was obtained. This oil was hydrogenated (iodine number 2.9) over Pd/C at 100° C. and a hydrogen partial pressure of 100 bar and, after filtration over Celite, was separated by distillation into fractions having different viscosities.

EXAMPLE 4 A

A synthetic, methyl-substituted n-alkane mixture prepared according to Example 4 was obtained which had an iodine number of 2.5 and the following properties:

| Viscosity at 100° C.: | 4.7 mm$^2$/s | DIN 51,562 |
|---|---|---|
| Viscosity at 40° C.: | 21.3 mm$^2$/s | DIN 51,562 |
| Viscosity index E: | 144 | DIN ISO 2909 |
| Flashpoint: | 210° C. | DIN ISO 2592 |

This hydrocarbon mixture has a biodegradability of 55% according to CEC-L-33-T-82.

EXAMPLE 4 B

A synthetic, methyl-substituted n-alkane mixture prepared according to Example 4 was obtained which had an iodine number of 4.0 and the following properties:

| | | |
|---|---|---|
| Viscosity at 100° C.: | 9.9 mm²/s | DIN 51,562 |
| Viscosity at 40° C.: | 63.3 mm²s | DIN 51,562 |
| Viscosity index E: | 141 | DIN ISO 2909 |
| Flashpoint: | 212° C. | DIN ISO 2592 |

This hydrocarbon mixture has a biodegradability of 55% according to CEC-L-33-T-82.

EXAMPLE 5

(Comparative Example)

A synthetic hydrocarbon mixture of hydrogenated α-decene oligomers having a weight average molecular weight (Mn) of 509 (PAO 4) (available from Ethyl Corp) exhibited the following properties:

| | | |
|---|---|---|
| Viscosity at 100° C.: | 4.0 mm²/s | DIN 51,562 |
| Viscosity at 40° C.: | 17.0 mm²/s | DIN 51,562 |
| Viscosity index E: | 137 | DIN ISO 2909 |
| Pour point: | <−70° C. | DIN ISO 3016 |
| Flashpoint: | 220° C. | DIN ISO 2592 |
| Noak volatility: | 15% | DIN 51,581 |
| Gear rig test by the FZG method, A 8.3/90: | Load level 3 | DIN 51,354 |

This hydrocarbon mixture has a biodegradability of 23% according to CEC-L-33-T-82.

EXAMPLE 6

(Comparative Example)

A synthetic hydrocarbon mixture of hydrogenated α-decene oligomers having a weight average molecular weight (Mn) of 656 (PAO 6) (available from Ethyl Corp) exhibited the following properties:

| | | |
|---|---|---|
| Viscosity at 100° C.: | 5.6 mm²/s | DIN 51,562 |
| Viscosity at 40° C.: | 29.0 mm²/s | DIN 51,562 |
| Viscosity index E: | 135 | DIN ISO 2909 |
| Pour point: | −66° C. | DIN ISO 3016 |
| Flashpoint | 234° C. | DIN ISO 2592 |
| Noak volatility: | 7.5% | DIN 51,581 |
| Gear rig test by the FZG method, A 8.3/90: | Load level 3 | DIN 51,354 |

This hydrocarbon mixture has a biodegradability of 25% according to CEC-L-33-T-82.

EXAMPLE 7

(Comparative Example)

A synthetic hydrocarbon mixture of hydrogenated α-decene oligomers having a weight average molecular weight (Mn) of 709 (PAO 8) (available from Ethyl Corp) exhibited the following properties:

| | | |
|---|---|---|
| Viscosity at 100° C.: | 7.9 mm²/s | DIN 51,562 |
| Viscosity at 40° C.: | 47.2 mm²/s | DIN 51,562 |
| Viscosity index E: | 138 | DIN ISO 2909 |
| Pour point: | −63° C. | DIN ISO 3016 |
| Flashpoint | 256° C. | DIN ISO 2592 |
| Noak volatility: | 4.1% | DIN 51,581 |
| Gear rig test by the FZG method, A 8.3/90: | Load level 3 | DIN 51,354 |

This hydrocarbon mixture has a biodegradability of 24% according to CEC-L-33-T-82.

EXAMPLE 8

(Application Example)

By blending 1.5 parts of an ash-free multipurpose additive with 98.5 parts of the synthetic hydrocarbon according to Example 4 A, a readily biodegradable hydraulic oil was obtained (>60% biodegradable).

EXAMPLE 9

(Application Example)

By blending 2 parts of an additive package with 98 parts of the synthetic hydrocarbon according to Example 4 A, a readily biodegradable compressor oil which is suitable in particular for refrigeration units which do not pollute the environment was obtained.

EXAMPLE 10

(Application Example)

By blending 1.5 parts of an ashless multipurpose additive and 98.5 parts of the synthetic hydrocarbon according Example 2, a largely biogradable (>70% biodegradable) synthetic hydraulic oil was obtained.

EXAMPLE 11

(Application Example)

By blending 1.5 parts of a suitable additive package and 98 parts of the synthetic hydrocarbons according Example 2, a largely biogradable compressor oil was obtained.

What is claimed as new and desired to be secured by letters patent of the U.S. is:

1. A lubricant comprising a biodegradable base oil comprising mixture of polymethylalkanes of the formula I:

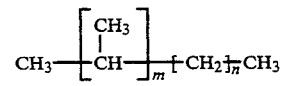

wherein the total number of carbon atoms, n+2m+2, is 20 to 100, the ratio of methyl and methylene groups to ethylidene groups is of from 3 to 20:1, and said ethylidene groups are always separated by at least one methylene group.

2. The lubricant according to claim 1, wherein said polymethylalkanes are prepared by oligomerizing α,ω-diolefins in a liquid phase at from 150° to 350° C. in the presence of AlX$_3$ or AlX$_2$H catalysts, wherein X denotes a (cyclo)aliphatic or aromatic radical having 1 to 30 C atoms, and subsequently hydrogenating the product of said oligomerization with a hydrogenation catalyst.

3. The lubricant according to claim 1, wherein said polymethylalkanes are prepared by pyrolysis of ethene/propylene copolymers at from 300° to 450° C. and of from 0.5 to 200 bar and subsequent hydrogenation of the product of said pyrolysis with a hydrogenation catalyst.

4. The lubricant according to claim 1, which further comprises conventional additives or other biodegradable or non-degradable base oils.

5. The lubricant according to claim 4, wherein said biodegradable base oils are pentaerythritol esters, oligo esters and dicarboxylic acid esters.

6. The lubricant according to claim 4, wherein said non-degradable base oils are poly-α-olefins and mineral oils.

7. The lubricant according to claim 4, wherein said conventional additives are present of from 0.5 to 5 weight % based on the total weight of the lubricant.

8. The lubricant according to claim 1, wherein said lubricant is at least 60% biodegradable as determined by CEC-L-33-AT-82.

9. The lubricant according to claim 1, wherein said lubricant is at least 70% biodegradable as determined by CEC-L-33-AT-82.

* * * * *